(12) United States Patent
Coker et al.

(10) Patent No.: US 9,001,450 B2
(45) Date of Patent: Apr. 7, 2015

(54) METHOD OF COMPENSATING FOR REPEATABLE RUNOUT ERROR

(75) Inventors: Jonathan D. Coker, Rochester, MN (US); Jeffrey L. Furlong, Irvine, CA (US); David R. Hall, Rochester, MN (US); David J. Stanek, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 64 days.

(21) Appl. No.: 13/529,309

(22) Filed: Jun. 21, 2012

(65) Prior Publication Data

US 2013/0342929 A1 Dec. 26, 2013

(51) Int. Cl.
*G11B 5/596* (2006.01)
(52) U.S. Cl.
CPC .................. *G11B 5/59627* (2013.01)
(58) Field of Classification Search
CPC ............ G11B 5/59627; G11B 20/10009; G11B 20/00007; G11B 5/59672; G11B 5/54; G11B 5/5526; G11B 5/58; G11B 5/56
USPC ........ 360/39, 55, 76, 69, 77.01, 77.02, 77.04, 360/75, 48
See application file for complete search history.

(56) References Cited

U.S. PATENT DOCUMENTS

| | | | |
|---|---|---|---|
| 6,449,116 B2 * | 9/2002 | Morris et al. ............ | 360/77.04 |
| 6,751,046 B1 * | 6/2004 | Szita et al. ............... | 360/77.04 |
| 7,071,935 B1 | 7/2006 | Deering et al. | |
| 7,136,251 B2 * | 11/2006 | Ehrlich et al. ............ | 360/77.02 |
| 7,251,097 B2 | 7/2007 | Hanson et al. | |
| 7,277,249 B2 * | 10/2007 | Okamoto ...................... | 360/75 |
| 2001/0043428 A1 * | 11/2001 | Morris et al. ............. | 360/77.04 |
| 2003/0112545 A1 * | 6/2003 | Hanson et al. ........... | 360/77.04 |
| 2003/0161066 A1 * | 8/2003 | Inoue et al. .............. | 360/77.04 |
| 2004/0021977 A1 | 2/2004 | Lim et al. | |
| 2005/0068658 A1 * | 3/2005 | Yamamoto .................... | 360/75 |
| 2010/0232057 A1 * | 9/2010 | Sanvido et al. ........... | 360/78.04 |
| 2011/0188149 A1 * | 8/2011 | Albrecht et al. ............ | 360/71 |
| 2013/0027806 A1 * | 1/2013 | Cho ............................ | 360/75 |

* cited by examiner

*Primary Examiner* — Thomas Alunkal

(57) ABSTRACT

A method of correcting repeatable run out (RRO) errors for a HDD in which RRO data is instead stored in consolidated form within the reserved area of the disk, instead of storing RRO data in the servo patterns for each HDD track or sector. RRO data is preferably stored in the reserved area of a hard disk drive in compressed form. The compressed RRO data is subsequently read into DRAM in compressed form and then decompressed for use. Predictive techniques determine what compressed RRO data is needed for upcoming read/write operations.

25 Claims, 7 Drawing Sheets

Distorted Tracks

602 →

| VRRO Bundle 1 start offset and length |
| VRRO Bundle 2 start offset and length |
| VRRO Bundle ... start offset and length |
| VRRO Bundle n-1 start offset and length |
| VRRO Bundle n start offset and length |

| VRRO Bundle 1 LUT |
| VRRO Bundle 1 data |
| VRRO Bundle 2 LUT |
| VRRO Bundle 2 data |
| VRRO Bundle ... LUT |
| VRRO Bundle ... data |
| VRRO Bundle n-1 LUT |
| VRRO Bundle n-1 data |
| VRRO Bundle n LUT |
| VRRO Bundle n data |

FIG. 6B

METHOD OF COMPENSATING FOR REPEATABLE RUNOUT ERROR

TECHNICAL FIELD OF THE INVENTION

This invention relates generally to the field of rotating, data-storage devices, and more particularly, to correcting repeatable run out errors in disk drives.

BACKGROUND

Rotating data-storage devices, commonly referred to as hard disk drives (HDD), read and write information along concentric tracks formed on disks. To navigate to a particular track on a disk, disk drives may use servo fields on the disk. These fields are utilized by a servo subsystem to position a head over a particular track. Servo writers write the servo fields onto the disk in tracks when the disk drive is manufactured and these fields are then accessed by the disk drive to determine position. Hereinafter, the path defined by the servo fields shall be referred to as the "servo track" to distinguish it from a data track. Ideally, a head following the center of a servo track moves along a perfectly circular path around the disk. In such an ideal case, the servo track and data track would be identical.

In reality, however, as a head attempts to follow a track it will not follow a perfect circular path. Instead, the head will deviate from the desired circular path due to a variety of factors including disk irregularity, disk eccentricity, and/or misalignments of the spindle axis assembly. This deviation from the desired path is referred to as "runout." Repeatable runout (RRO) refers to deviation that is non-random and occurs with some predictability. During disk drive manufacture, RRO can be measured and corresponding RRO offset values can be determined. Such RRO correction data can be generated for each track, or even each sector, and then stored on the disk within the servo pattern.

There are two types of RRO, synchronous RRO and Non-synchronous RRO. Synchronous RRO has minimal variation from track to track and is predictable. It can usually be easily compensated for through calibration factors applied globally to the entire disk. These global calibration factors are often stored in the reserved area of the disk. Non-synchronous RRO is more problematic because it is unpredictable and varies from track to track. It is corrected through RRO correction data generated for each track or sector and typically stored on the disk in the same area as the servo pattern for each track sector. When the HDD is operational, the correctional data is read and applied in the servo-control loop.

Determining the offset values for each sector and writing the RRO data to the RRO field portion of the individual sector servo patterns is a very time consuming process. Because the data is stored within each track sector, the RRO data takes up disk surface area that could be used to store user data. Typically about 20-50% of the servo sector overhead is for RRO data. Further, the RRO data is also spread out, so there is no efficient way to compress all of the RRO data to save on disk space.

Accordingly there is a need for an improved method to compensate for storing and accessing non-synchronous RRO data.

SUMMARY OF THE INVENTION

Preferred embodiments of the present invention are directed at a method of correcting repeatable run out (RRO) errors for a HDD in which RRO data is instead stored in consolidated form within the reserved area of the disk, instead of storing RRO data in the servo patterns for each HDD track or sector. RRO data is preferably stored in reserved area of hard disk drive in compressed form. The compressed RRO data is subsequently read into DRAM in compressed form and then decompressed for use. Predictive techniques determine what compressed RRO-data is needed for upcoming read/write operations.

In some preferred embodiments, shingled magnetic recording (SMR) is utilized with data written in a shingled fashion so that data writes are predictable and deterministic. RRO data, which is used to control write operations, can be prefetched from the reserved area (RA) to dynamic random access memory (DRAM) so that it will be ready when needed. The sequential nature of SMR write operations means that a relatively small data cache can be used. When RRO-data is needed to write specific tracks, data can be decompressed on the fly to reduce latency.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

FIGS. 6A and 6B show a RA entry for header information and a RA entry for data information according to a preferred embodiment of the present invention.

The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

In preferred embodiments of the present invention, instead of storing RRO data in the servo patterns for each HDD track or sector, RRO data is instead stored in consolidated form within the reserved area of the disk. RRO data is preferably stored in reserved area of hard disk drive in compressed form. The compressed RRO data is subsequently read into DRAM in compressed form and then decompressed for use. Predictive techniques determine what compressed RRO-data is needed for upcoming read/write operations.

In some preferred embodiments, shingled magnetic recording (SMR) is utilized with data written in a shingled fashion so that data writes are predictable and deterministic. RRO data, which is used to control write operations, can be prefetched from the reserved area (RA) to dynamic random access memory (DRAM) so that it will be ready when needed. The sequential nature of SMR write operations means that a relatively small data cache can be used. When RRO-data is needed to write specific tracks, data can be decompressed on the fly to reduce latency.

Figure 1A:
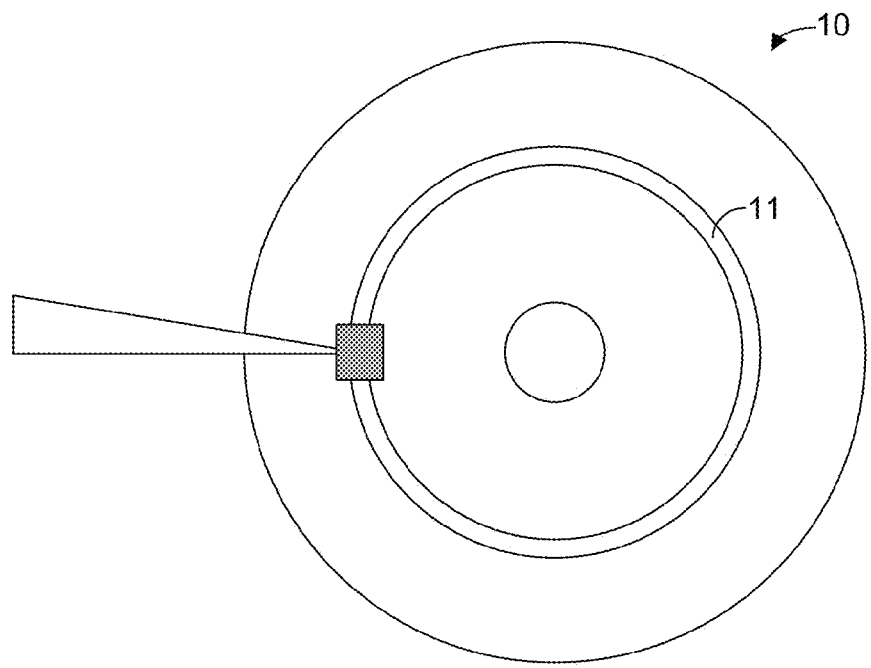
FIG. 1A is a view of an ideal servo track on a magnetic disk.

As described above, repeatable runout error (RRO) refers to repeating, non-random errors in the servo signal that controls read/write head position in a HDD. Ideally, a head following the center of a servo track moves along a perfectly circular path around the disk. FIG. 1A shows a disk storage device 10 and an ideal servo track path 11. Ideal servo track path 11 is intended to be a concentric circle.

Figure 1B:
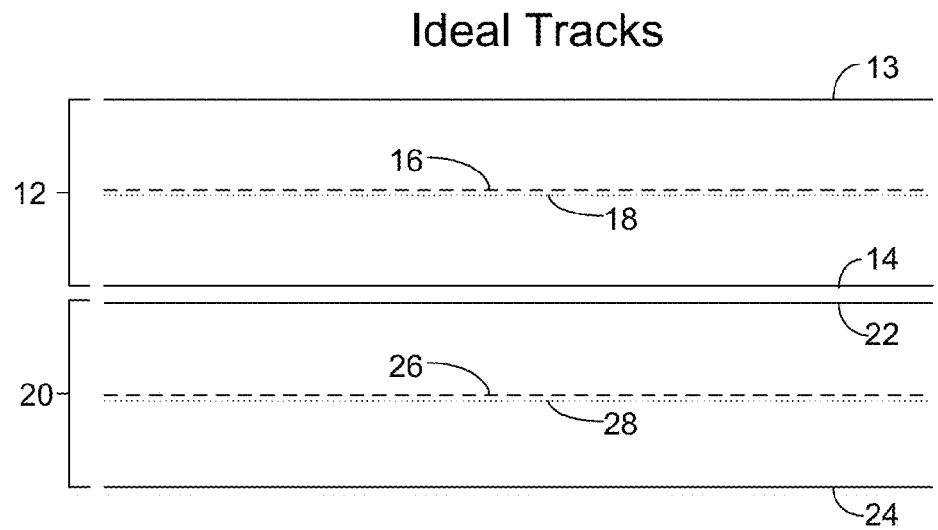
FIG. 1B illustrates two adjacent ideal servo track paths on the magnetic disk of FIG. 1A.

FIG. 1B illustrates two adjacent ideal servo track paths. Track 12 represents a first ideal track laid on the disk. Lines 13 and 14 represent the outer bounds of track 12. Line 16 represents the ideal center of track 12 and dashed line 18 represents the actual path that would be taken if track 12 followed the ideal path. Track 20 represents a second track laid subsequent to and adjacent to track 12. Lines 22 and 24 represent the outer bounds of track 20. Line 26 represents the ideal center of track 20 and dashed line 28 represents the actual path that would be taken if track 20 followed the ideal path. As shown in FIG. 1B, the ideal centers 12 and 26 are exactly followed by the actual paths 18 and 28.

Figure 2A:
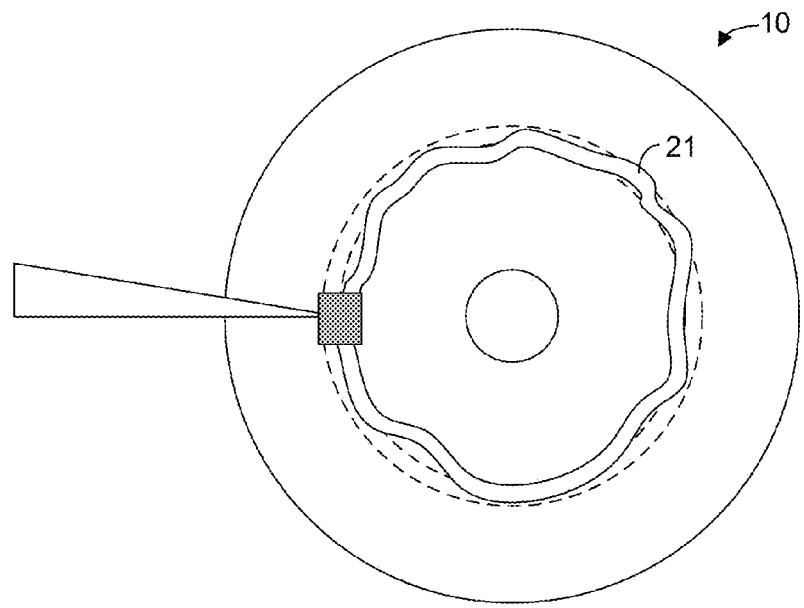
FIG. 2A is a view of an actual servo track on a magnetic disk.

In reality, however, as a head attempts to follow a track it will not follow a perfect circular path. Instead, the head will deviate from the desired circular path due to a variety of factors including disk irregularity, disk eccentricity, and/or misalignments of the spindle axis assembly. FIG. 2A shows a representation a disk storage device 10 and a non-ideal servo path track path 21. The non-ideal servo track path 21 does not follow a perfect concentric circular path. Rather, as discussed above, physical forces prohibit the track from following the ideal path.

Figure 2B:
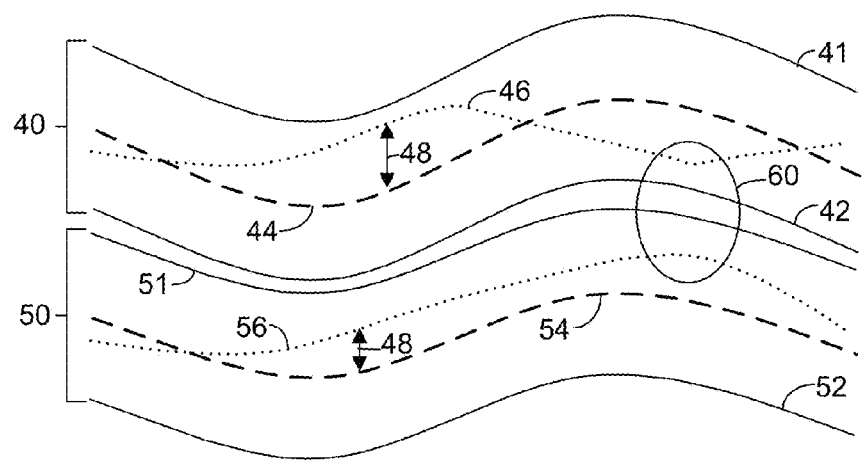
FIG. 2B illustrates two adjacent non-ideal tracks on the magnetic disk of FIG. 2A.

FIG. 2B illustrates two adjacent non-ideal tracks 40 and 50. Lines 41 and 42 represent the outer bounds of non-ideal servo track 40. Line 44 represents the ideal center of track 40; and line 46 represents the actual path taken by the read/write head. Lines 51 and 52 represent the outer bounds of non-ideal servo track 50. Line 54 represents the ideal center of track 50; and line 56 represents the actual path taken by the read/write head. As shown in FIG. 2B, due to the written-in runout errors, the tracks themselves are not straight and uniform. Further, due to other types of runout errors, the actual path also fails to follow the center path. The write/read track head misregistration (TMR) (48, 58) is the distance between the ideal center path and the actual center path.

If the deviation between the desired and actual track positions becomes too large, subsequent read operations may not be able to find the data. Also, subsequent data may actually erase previously written data. Track squeeze, seen within circle 60, occurs when the actual paths of the read/write head gets too close together in adjacent tracks. This can result in demagnetization of track 40 as subsequent track 50 is written.

As described above, at least a portion of the TMR shown in FIGS. 2A and 2B results from repeatable runout error (RRO), which refers to repeating, non-random errors in the servo signal that controls read/write head position in a HDD. While RRO may be caused by several factors, one of the most important is the non-ideality of servo tracks. Servo tracks typically do not follow an ideal path due to "written-in" errors that arise during the creation of the servo fields. Written-in errors occur because of movement in the write head used to produce the servo fields during manufacture. A drive head attempting to follow a servo track must continuously compensate for this written-in error to prevent servo track misregistration.

During manufacturing time, RRO (whether written-in RRO or RRO caused by other factors) can be measured and corresponding RRO offset values can be determined. Such RRO correction data can be generated for each track, or even each sector, and then stored on the disk within the servo pattern. RRO data can be used to generate a correction signal that can be injected into the drive servo-loop to correct imperfections in the concentricity of the drive head path, which is useful to increase performance of the HDD.

Figure 3:
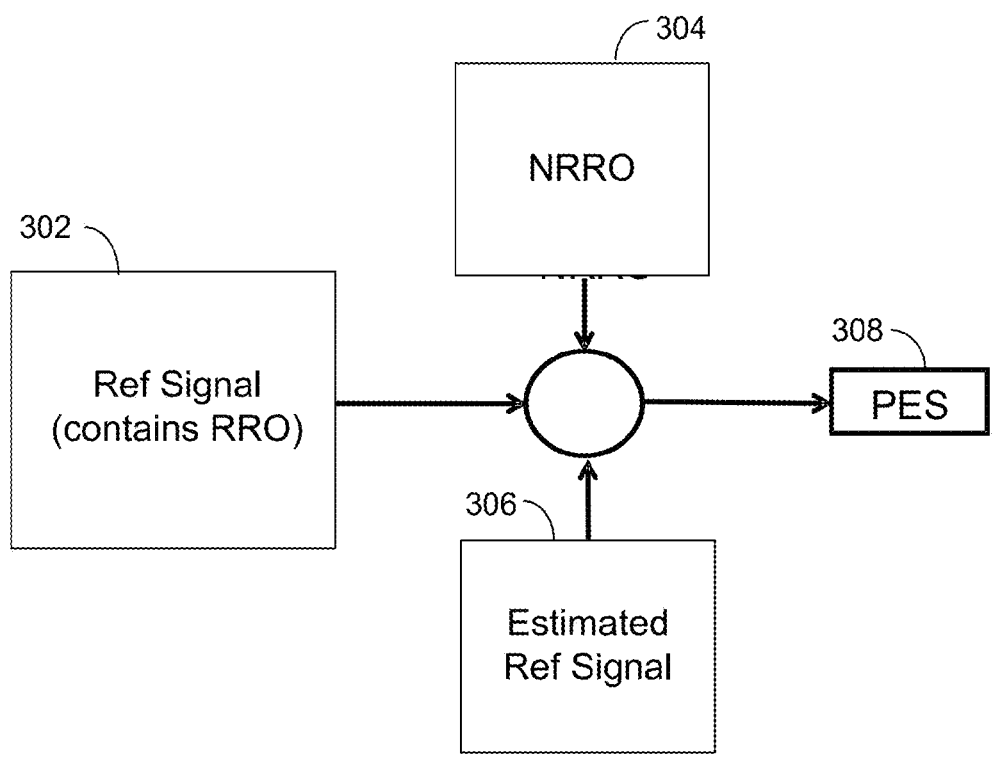
FIG. 3 shows a block diagram illustrating the basic types of errors that can affect the head position in an HDD servo system.

FIG. 3 shows a block diagram illustrating the basic types of errors that can affect the head position in an HDD servo system. As discussed above, repeatable runout error (RRO) refers to repeatable and non-random errors that consistently cause track misregistration. The reference signal 302 is generated by internal circuitry based on a desired location for the read/write head. Although under ideal circumstances, the reference signal 302 will correspond to the desired location of the read/write head, under real-world conditions, the reference will actually contain various positional errors (written-in RRO). The servo loop is also affected by various types of non-repeatable runout errors, which are random nonrepeatable errors caused, for example, by disk, enclosure, and head vibration, and other types of RRO (non-written-in errors). Runout error that is not repeatable is known as non-repeatable runout error or NRRO 304. NRRO 304 is random and not repeatable, and may be caused by events such as shock to the disk drive, windage in the hard drive disk, resonance of the actuator, or disk flutter. An estimated reference signal 306 can be used to compensate for NRRO, and it can also be used to compensate for known RRO. It is impractical to have the estimated reference signal compensate perfectly for the NRRO, or for the RRO in the original reference signal. Hence, the final signal will likely contain some position error signal 308.

During HDD manufacturing, RRO is typically measured and corresponding offset values determined. This is done for each HDD, for each track on every disk, and for each sector ID in each track (for example, each track might be divided into 500 individual sectors). The offset or correction values are stored on the disk in the same area as the servo pattern for each track sector. When the HDD is operational, the correctional data is read and applied in the servo-control loop.

Determining the offset values for each sector and writing the RRO data to the RRO field portion of the individual sector servo patterns is a very time consuming process. A benefit of this known error compensation scheme is that the RRO data is always available for the current data track since it is stored with the servo patterns for each data track. Also, only the current track's or sector ID's RRO data needs to be in DRAM or SRAM at any one time.

There are some significant disadvantages, however, to the current method of storing RRO data alongside the sector servo patterns. Because the data is stored within each track sector, the RRO data takes up disk surface area that could be used to store user data. Typically about 20-50% of the servo sector overhead is for RRO data.

Also, because the RRO data is written sector by sector, the process of encoding the data onto the HDD is relatively slow. Typically in order to write this RRO data to a disk, once a correction value for a track or sector was determined, it would then be written in that same track or sector. The correction value would then have to be checked by reading the value on another disk revolution. Although this additional time is small for any given track or sector, it adds up to a significant amount of time given the increasing capacities of disk drives today. The time expended is even more significant when considered in light of the large numbers of HDDs that are manufactured and sold each year.

Further, the RRO data is also spread out, so there is no efficient way to compress all of the RRO data to save on disk space. Also, smaller amounts of data written at large numbers of locations for a given HDD results in wasted space due to data fragmentation, and associated overheads of starting and ending locations on the disk where such data can be stored.

In contrast, preferred embodiments of the present invention, RRO data is stored within a consolidated area of the disk called the reserved area (also referred to as the maintenance area). The term "reserved area" refers to space on a typical disk drive that is kept in reserve for storing data that is unavailable to the user or to software other than host BIOS code. Certain types of critical information are typically stored in the disk reserved area, including firmware for the HDD, drive state information, log information, etc. This type of critical information is required to operate the disk drive and is used by the operating system or hardware in the operation of the drive.

In some preferred embodiments, at least part of the RRO data can be stored in Write Twice Cache (W2C) regions of the disk. Write Twice Caching use provides a fail-safe in the event of a write failure by utilizing specially arranged reserved portions of disks to write the cached data during HDD idle time before finally writing the data to its intended ultimate disk location. Because the W2C regions are numerous and distributed equally throughout the disk surface, they provide a convenient location to store small collections of RRO data, each for several servo tracks.

Storing RRO data in the reserved area is advantageous for a number of reasons. It allows the RRO data to be written in bulk rather than distributed across the disk. This single collection of data results in less wasted space, consumes less surface area on the disk, and thus increases areal density.

The reserved area on a HDD also typically makes use of error correcting codes (ECC) and cyclic redundancy checks (CRC) that improve readability and reliability of data stored in this area. Where RRO data is written to individual tracks or sectors, the data is more susceptible to read errors caused by, for example, damage to the disk surface or track mis-registration. Various types of error checking can be employed to make sure the correct data is written to the disk and that some types of damage can be corrected. Increased readability also increases performance. Where any type of read error occurs, the next step is to wait for the disk to spin and to try to read the data again. Error checking in the reserve area helps avoid the delays caused by read errors for data stored in each track or sector.

Preferred embodiments of the present invention also provide a decreased manufacturing time. As described above in prior art, when RRO data is distributed among tracks and sectors, the correction value for a given track or sector is first determined, then immediately written to that same track. The data must then be checked on a subsequent disk revolution to make sure the data was successfully written to the track.

By storing the RRO data in the reserved area according to embodiments of the present invention, it is not necessary to immediately write the data to the disk. Instead, as the correction values for tracks and sectors are determined, they can be stored for example in a memory, and then periodically written to the RA in bulk. Also, because the RA preferably has an error checking mechanism, such as CRC and ECC, the step of confirming the write operation by spinning the disk and reading the data can be eliminated, resulting in a non-trivial time savings.

Also, because the RRO data is consolidated in one location, or at least a small number of locations, rather than distributed across the disk, the RRO data can be more efficiently compressed, which will obviously allow the HDD to have a higher capacity for user data. As discussed in greater detail below, any suitable prior art compression algorithm can be used.

Embodiments of the present invention are especially advantageous for use with Shingled Magnetic Recording (SMR) drives, although embodiments of the present invention could also be practiced using Perpendicular Magnetic Recording (PMR) drives or Longitudinal Magnetic Recording (LMR) drives. Shingled Magnetic Recording is based on partially overlapping, or shingling, adjacent tracks, leaving only a relatively small strip of the previous write track untouched. While this strip is a fraction of the feasible write size, it is still sufficiently large to be read with current read heads. As a result, shingled writing can place tracks closer together, and data density within a track can also be increased. Shingled writing is described, for example, by Kasiraj et al., in U.S. Pat. No. 6,967,810, for "System and method for writing HDD depending on direction of head skew," which is incorporated by reference for all purposes as if fully set forth herein.

The increase in areal density comes at a price, however. Specifically, rewriting a sector on a track that has been shingled over cannot be done without overwriting subsequent ("down-band") tracks. SMR is thus ideally suited for long, sequential operations, while random writes and deletes are more problematic. Although a variety of strategies have been developed to address SMR's problems with random writes and deletes, it is typically advantageous for data on a shingled disk to be organized into bands of shingled tracks with a non-shingled guard region between bands.

Figure 4:
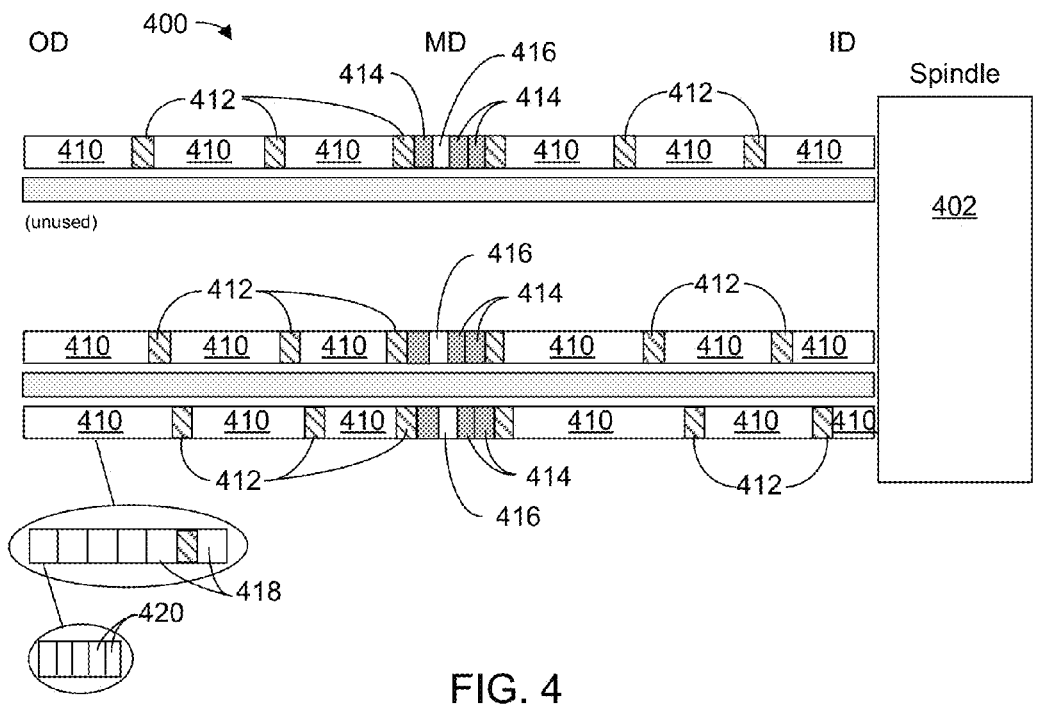
FIG. 4 is a schematic illustration of a HDD surface layout 400 for a SMR drive that can be used to practice preferred embodiments of the present invention.
Figure 8:
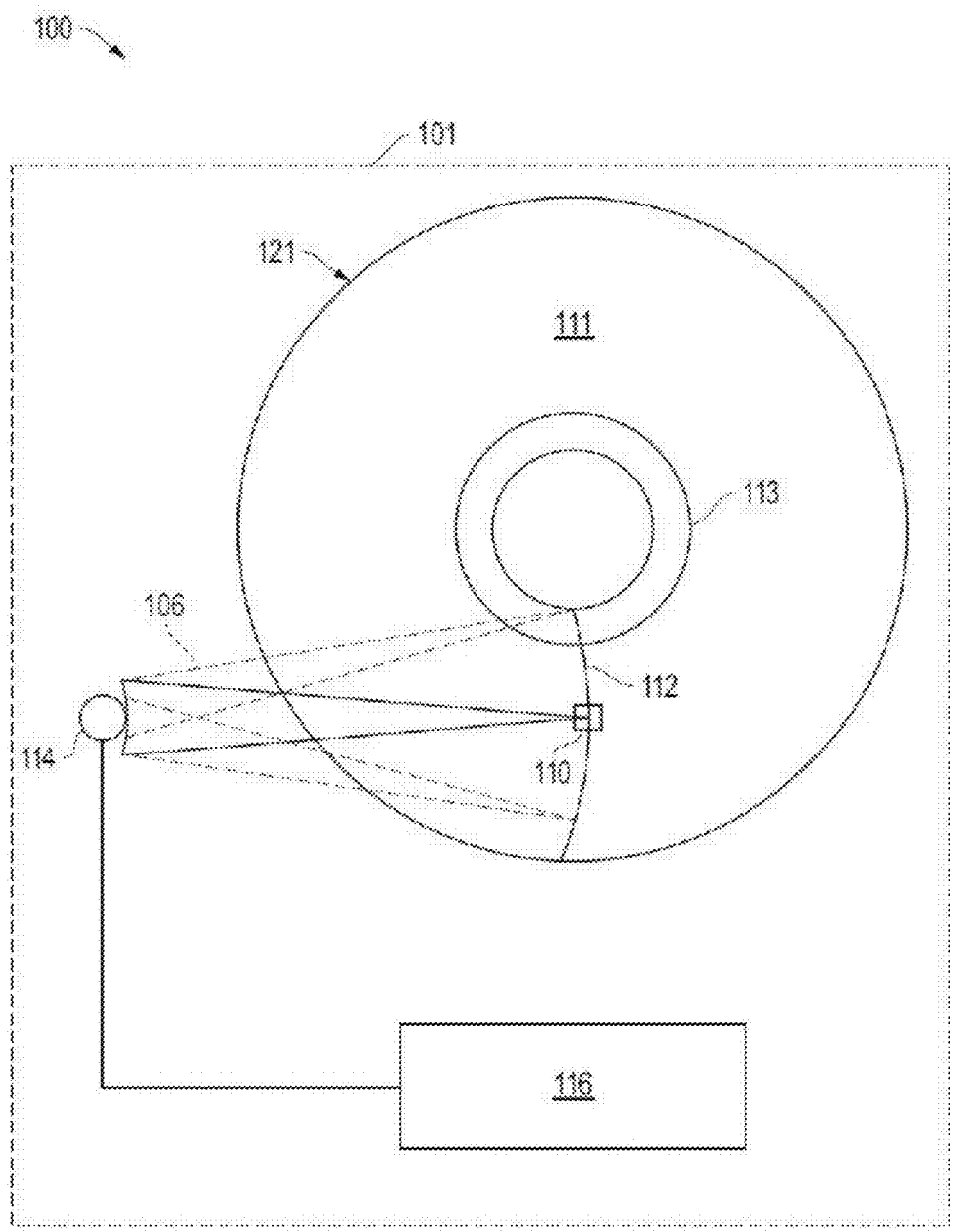
FIG. 8 shows a prior art hard disk drive assembly suitable for use with embodiments of the present invention.

FIG. 4 is a schematic illustration of a HDD surface layout 400 for a SMR drive that can be used to practice preferred embodiments of the present invention. Embodiments of the present invention could also be practiced using a Perpendicular Magnetic Recording (PMR) Drive or Longitudinal Magnetic Recording (LMR) Drive. Referring also to FIG. 8, a hard disk drive (HDD) assembly 100 generally comprises one or more magnetic disks 111 mounted on a central rotating spindle 402 and rotated at high speeds by a spindle motor (not shown) during operation. Concentric data tracks 113 are typically formed on both the upper and lower disk surfaces to receive and store information. Magnetic read/write heads 110 are moved across the assembly to write data to a disk surface or to read data from it.

As shown in the schematic of FIG. 4, the reserved area 416 (RA) is preferably located toward the middle diameter (MD) of each magnetic disk surface. In the HDD of FIG. 4, the user accessible tracks have been organized into various logical groups and segments. The reserved area RA 416 in the HDD of FIG. 4 is located at middle diameter (MD) of the disk. The user accessible tracks are organized into logical grouping, with the majority of the tracks included within groupings designated as I-Areas 410. The tracks in the I-Areas 410 are shingled tracks and function as the primary data storage tracks of the HDD drive, although the I-areas 410 are typically not written to by host operations but are instead only updated in background refresh operations. In the example layout of FIG. 4, I-Area segment 410 located at the disk outer diameter (OD) is composed of several I-Regions 418, each composed of several I-Tracks 420, each in turn having several thousand logical block addresses (LBAs). While all I-Regions on the disk will typically have the same number of I-Tracks, I-Area segments will not have the same number of I-Regions. This difference is partly due to adaptive TPI, defects, and varying capacity from the disk OD to the inner diameter (ID). The shingled I-regions are preferably separated from one another by non-shingled buffer regions.

In the embodiment of FIG. 4, the I-areas are usually separated from each other by unshingled Write Twice Cache 412 (W2C) areas. Several I-Areas are grouped from OD to inside diameter (ID), each followed by a W2C segment 412. The pattern of several I-Areas 410 followed by a W2C segment 412 is continued from the OD to the ID of the disk, with W2C segments staggered among several disk surfaces of the drive.

A number of tracks near the MD are also grouped together into regions referred to as E-regions 414. In the HDD of FIG. 4, there is one E-region to the outside (closer to the disk OD) of the RA, and two E-region segments to the inside of the RA. These segments can be used for direct writes from the host computer, with the data being periodically cleared from the E-region 414 by being combined with data from an I-region and rewritten to an I-region track during a background refresh operation. This process is described in detail by Hall et al., *Data Handling Algorithms for Autonomous Shingled Magnetic Recording HDDs*, 48 IEEE TRANSACTIONS ON MAGNETICS, pp. 1777-1781 (May 2012), which is incorporated herein by reference.

The HDD surface layout shown in FIG. 4 is merely one example of a layout that could be used to practice embodiments of the present invention. Persons of skill in the relevant art will recognize that a variety of known disk layouts could also be used, both for shingled and unshingled drives. Physically, there is no difference between tracks used for the groupings described above, and all tracks can be used for any type of grouping. The disk drive need only account for how the disk space has been assigned.

The RA and W2C regions are preferably unshingled, and therefore have approximately twice the track width as the shingled tracks. RRO correction may not be needed for reading or writing data to these unshingled regions. In some embodiments, the RRO data will be written exclusively in the RA, which has the advantage of relative simplicity.

In other embodiments, the RRO data can be written partially in the RA and partially in one or more W2C regions. In some cases this second option can result in increased performance due to the closer proximity of W2C regions to the I-regions where data is being written using the RRO corrections that are obtained from the W2C regions. The data reliability of this option is somewhat lower, however, due to potential Far Track Interference (FTI) and Adjacent Track Interference (ATI), as write operations to the W2C over time may disturb the stored RRO correction values.

Finally, in some embodiments, the RRO data can be written entirely in the RA and partially in the W2C. This option is more complex, but highly reliable. Under this embodiment, the RRO header and data information can be stored in the RA, while the RRO data information can also be stored distributedly in the W2C. In the event of any FTI or ATI issues, backup copies of data stored in the RA can be used to refresh the data in the W2C by rewriting the data.

During HDD operation, in order to make use of the RRO data stored in the RA or W2C areas, the data is preferably read into DRAM so it is accessible to control the HDD head positioning. Reading the RRO data directly from the RA before a read/write operation at each data track would typically have an unacceptable I/O latency. In most cases, the amount of RRO data will be too large to be stored in the DRAM cache at one time. As a result, it will usually be desirable to cache only selective portions of the RRO data in DRAM at any one time. This type of selective caching works particularly well for SMR because the sequential nature of the shingled recording process means that the tracks in which data will be written are known ahead of time. For example, when writing to track_N, the RRO data for track_N+1 can be located and loaded into DRAM.

For non-SMR drives, it would be desirable to make use of various known predictive techniques to determine what RRO data needs to be loaded into DRAM. For example, various types of scheduling algorithms such as rotational position optimization (RPO) are commonly used to make read/write operations more efficient. A common feature of many such scheduling algorithms is a queue of scheduled read/write operations organized to make the disk operation more efficient. Such a queue of upcoming read/write operations can also be used to determine which RRO data should be pre-loaded into DRAM so that it will be available when the read/write command is executed. Obviously, in the same fashion, the queue can be used to determine which data already loaded into DRAM can be evicted to make room for the new data.

Figure 5:
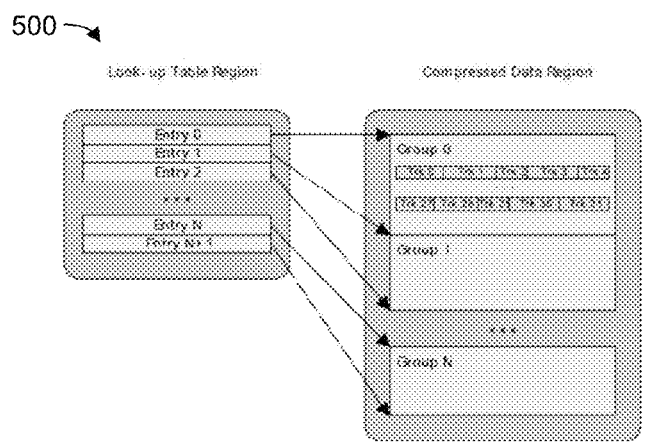
FIG. 5 shows an example of a look-up table format that could be used according to preferred embodiments of the present invention.

In preferred embodiments of the present invention, a Look-Up Table (LUT) can be used to determine the location in the RA for the desired track's or sector's RRO data. FIG. 5 shows an example of a look-up table format 500 that could be used according to preferred embodiments of the present invention. This LUT can be written to the RA during the drive manufacturing as the RRO data is written during the drive manufacturing process. When the drive is operated, the RA LUT can be loaded and placed in DRAM during drive spinup. Alternatively, the LUT shown in FIGS. 6A and 6B can be distributed with the RRO data rather than loaded into DRAM all at once. In such a case, the partial LUT can be loaded from the RA only when the associated RRO data for target tracks or sectors is needed.

When the RRO data for a new track or sector needs to be loaded into DRAM (determined for example as described above) the RA LUT will be used to determine the location of the desired data in the RA. The data can then be loaded and placed into DRAM. When the desired data is actually placed into DRAM, preferably an entry will be made into the DRAM LUT, which reflects the precise location of the data loaded into DRAM. Once the RRO data for a track or sector is ready to be used, the DRAM LUT can be accessed to determine the data location, then the desired RRO data can be read or decompressed from DRAM and injected into the drive servo-loop to correct the drive's head positioning.

In preferred embodiments of the present invention, the RRO data can be stored in the RA in compressed form to further save disk storage space. Preferably, the compensation data is stored and compressed as time-domain compensation values. There are a large number of well known compression algorithms that can be applied to compression/decompression of time-domain compensation values.

In some preferred embodiments, for example, the RRO data can be compressed using a delta encoding scheme, which stores only the difference between samples along with an initial sample value. A limited set of delta values are allowed, and these values are encoded using a fixed Huffman code. The actual compression algorithm will be implemented in firmware for maximum flexibility. As will be appreciated by those of ordinary skill in the art, selecting a compression level requires a trade-off between amount of data storage required and the RRO data fidelity. Lower compression levels result in greater amounts of stored data, while at higher compression levels the data takes up less room but greater error is introduced into the decompressed data.

Preferably, tracks are grouped into RRO bundles of several (e.g. 16 or 32) tracks to improve memory efficiency. LUT entries can indicate the starting and ending addresses of each group of tracks. In some preferred embodiments, the data stored in the RA can be indexed with a file ID header that points to locations where the RRO bundles are stored. This RA ID header (RID) includes each bundle's starting offset address (from the beginning of the storage area) and the length of the specific RRO bundle. The stored RRO data is contained in a separate storage area, with the data for each bundle including LUT data and compressed data. An example of this type of data format is shown in FIGS. 6A and 6B.

Once the compressed data is retrieved from the RA and stored in DRAM, a hardware based decompression engine can be invoked to pull compressed data out of DRAM, decompress the specified track, and place the RRO information into a memory mapped SRAM, according to preferred embodiments. The particular compression algorithm used can be implemented in software.

The preferred decompression engine relies on properly formatted data placed in two regions of DRAM space. These regions are the look-up table region and the compressed data region. The look-up table contains entries that point to groups of tracks within the compressed data region. The compressed data region contains compressed RRO data for groups of tracks. The decompression engine, once properly configured and enabled, will fetch an entry out of the look-up table that corresponds to the group associated with the selected track and head. This entry gives the engine the compression header, such as type and size, of the group and the offset into the compressed data region where the group is located. After the offset and size of the group's compressed data is calculated, the engine begins fetching data from the compressed data region and placing it into a cache. The decompression core is activated and it begins pulling data out of the cache and decompressing. Once it reaches the specified track within the group, the decompressed data is placed into an output buffer. After the entire track is decompressed, the output buffer can be flagged as valid, and the engine can shut down.

The amount of time required for a decompression operation will vary based on the following factors.
  Compression algorithm and associated decompression hardware: Certain time-domain compression algorithms may be easily implemented in hardware, while others may require additional hardware clock cycles to decompress data. In any hardware design, the speed of the circuit is dependent upon how much hardware and parallelism is allocated for use.
  Number of sector ID's per track: The number of RRO samples per track will impact the decompression time proportionally.
  Track index: The location of the track within the group will impact decompression time. The first track within a group will be decompressed much faster than the last. If a group size of 32 is selected, then the worst-case decompression time will be twice as large as a group size of 16.
  DRAM access: There will be some slight variation in decompression time due to DRAM access priority scheduling. Host and drive DMA operations may have higher priority than the RRO engine, for example.

Figure 7:
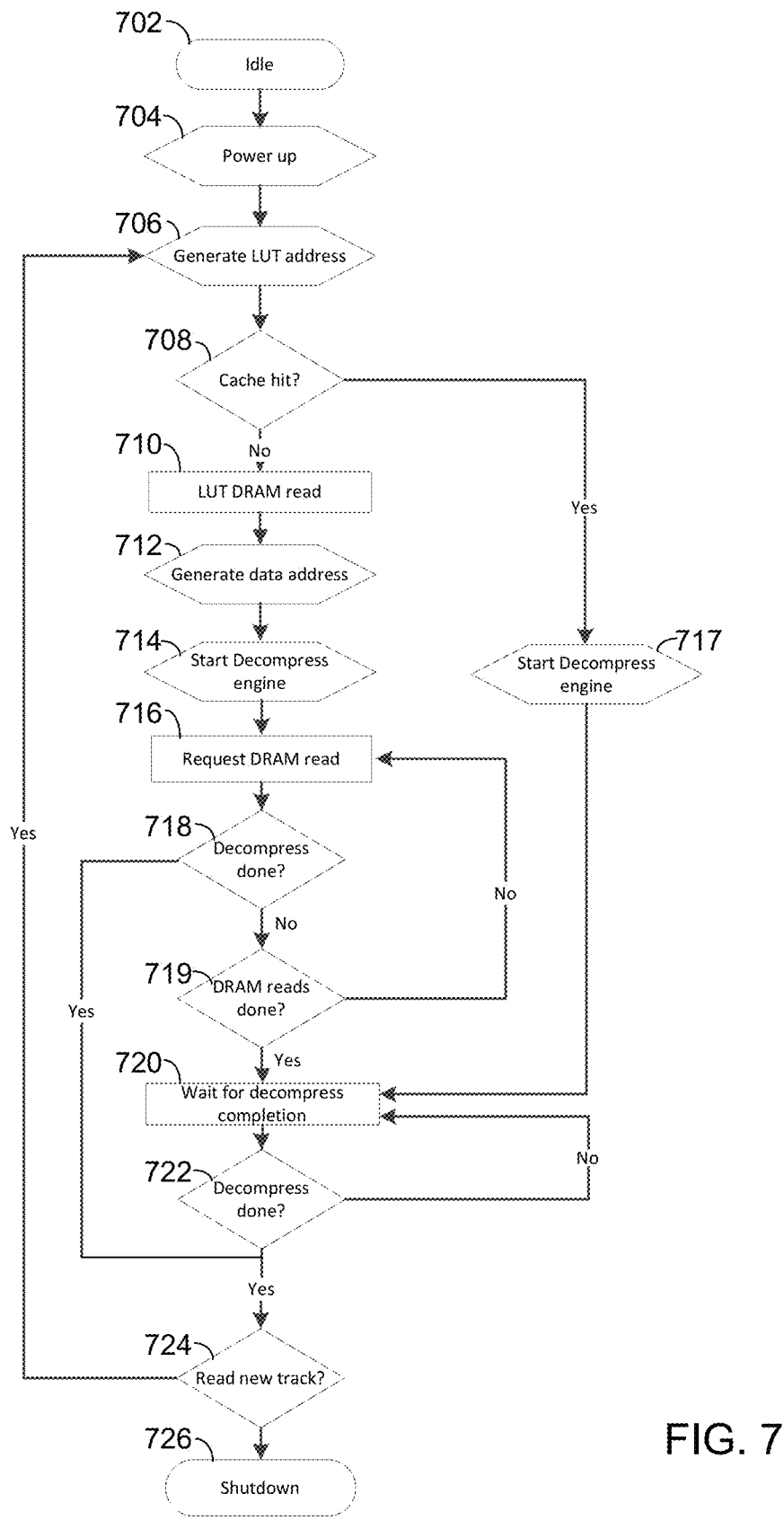
FIG. 7 is a flowchart showing the process of retrieving and decompressing RRO data according to preferred embodiments of the present invention.

FIG. 7 is a flowchart showing the process of retrieving and decompressing RRO data as described above. In step 702, the disk is in an idle state. In step 704, the disk spinup begins with a clock power up and status clear. In response to an instruction to access a particular track or sector, an address will be provided for the LUT in 706. Once the address for a particular RRO bundle is activated by the firmware, which may correspond to the logical location of an E-Region or I-Region in a SMR drive, the compressed RRO data for that RRO bundle (and the LUT data if it is also cached) must be determined and loaded. First, the LUT entry is checked to see if the desired data is already loaded into the DRAM cache (in 708). If so, the decompression engine will be started (717).

If not, a suitable DRAM location may first be selected for caching the data. The Firmware will then request the LUT entry. If the LUT entry does not exist, the Firmware will then read the RA ID header (RID) and then locate the appropriate LUT or RRO bundle, comprised of LUT and RRO data. Once the LUT entry exists, the Firmware will use the LUT to index into DRAM (710) to find the location of the target RRO data (712). As described above, in some instances RRO data may also be stored in W2C, in which case the appropriate data can be retrieved from W2C. The resultant RRO data can then be cached into DRAM at the appropriate address. If a previous RRO bundle's data is currently in DRAM, the new RRO bundle's data will overwrite it.

Once the desired compressed RRO data is available in DRAM, the decompression engine will then be started (714). In the flowchart of FIG. 7, the decompression engine first locates the desired data in the cache (716). The appropriate portion of the compressed data in DRAM is also preferably located via the DRAM LUT. The decompression engine then begins decompressing the RRO bundle, beginning with the first track in the bundle. Once the decompression reaches the specified/desired track within the group, the decompressed data is placed into an output buffer, where it can be introduced into the servo loop to correct the head position. Steps 718 through 722 show the iterative process that continues until the decompression of all data read from DRAM is completed.

The process can then continue with the next data location to be decompressed 724, which returns the process back to step 706, or the decompression hardware can shutdown (726). Significantly, the processes of fetching compressed data to DRAM and of decompressing the RRO data can overlap with other steps in the process. Preferably, before the system has finished the read/write operation at one track, the RRO data for the next read/write location has already been retrieved from the RA to DRAM and has been decompressed with the relevant RRO data placed into the SRAM output buffer for access by the servo microprocessor.

FIG. 8 depicts a hard disk drive assembly 100 suitable for use with embodiments of the present invention. HDD assembly 100 comprises a housing or enclosure 101 with one or more media disks 111 rotatably mounted thereto. The disk 111 comprises magnetic recording media rotated at high speeds by a spindle motor (not shown) during operation. Concentric magnetic data tracks 113 are formed on either or both of the disk surfaces to receive and store information.

Embodiments of a read/write head 110 may be moved across the disk surface by an actuator assembly 106, allowing the head 110 to read and/or write magnetic data to a particular track 113. The actuator assembly 106 may pivot on a pivot 114. The actuator assembly 106 may form part of a closed loop feedback system, known as servo control loop, which dynamically positions the read/write head 110 to compensate for thermal expansion of the magnetic recording media 111 as well as vibrations and other disturbances or irregularities. Also involved in the servo control system is a complex computational algorithm executed by a microprocessor, digital signal processor, or analog signal processor 116 that receives data address information from a computer, converts it to a location on the disk 111, and moves the read/write head 110 accordingly.

To reposition a read/write head, a set point signal 412 is input by a controller (not shown). Based on the set point signal, the controller generates an actuator current signal, which is input to the actuator assembly 106. The actuator current signal drives the voice coil motor (not shown), which moves the read/write head 110 to a position on the disk 111. The read/write head 110 typically includes a sensor (not shown) for reading servo data on a servo track. The sensor provides an actual position signal that is indicative of the actual position of the head relative to the disk. The actual position signal is directly fed back to adjust the set point signal via the servo loop.

In a typical hard disk drive system, read/write heads 110 periodically reference servo patterns recorded on the disk to ensure accurate head 110 positioning. Servo patterns may be used to ensure a read/write head 110 follows a particular track 113 accurately, and to control and monitor transition of the head 110 from one track to another. Upon referencing a servo pattern, the read/write head 110 obtains head position information that enables the control circuitry 116 to subsequently realign the head 110 to correct any detected error.

As described above, in a typical prior art HDD, RRO data can also be written along with the servo patterns or servo sectors. This RRO data can be accessed for each track or sector to compensate for RRO present during the HDD manufacturing process.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

We claim as follows:

1. A method of correcting repeatable run out (RRO) errors in a rotating data-storage device having a magnetic read/write head and a magnetic disk with a plurality of data tracks and configured for shingled magnetic recording, the method comprising:
    obtaining a value for a position error signal indicating the relative difference in position between the ideal position of the magnetic read/write head relative to a data track and the actual position of the magnetic head relative to the data track;
    calculating an RRO offset value to correct positional error of the magnetic read/write head relative to a plurality of data tracks;
    storing the RRO offset values for said plurality of data tracks as RRO data in a reserved area on the magnetic disk, said reserved area being a data storage area on the magnetic disk that is unavailable to software other than host BIOS code;
    predicting the next track to be written based on the sequential nature of the shingled magnetic recording process;
    reading into dynamic random access memory (DRAM) from the reserved area on the magnetic disk the RRO data for the next track to be written;
    accessing the RRO data from DRAM to correct the magnetic head position relative to the data track, the RRO data containing the RRO data for the next track to be written; and
    writing the next track using the RRO data loaded into DRAM.

2. The method of claim 1 in which storing the RRO offset values for said plurality of data tracks as RRO data in a reserved area on the magnetic disk comprises compressing the RRO offset values to form compressed RRO data and storing compressed RRO data in a reserved area on the magnetic disk.

3. The method of claim 2 in which accessing the selective portion of the RRO data from DRAM comprises decompressing the RRO data and accessing the decompressed RRO data.

4. The method of claim 1 in which the reserved area comprises a reserved area located at the middle diameter of the disk.

5. The method of claim 1 further comprising storing RRO data in at least one Write Twice Cache region located away from the middle diameter or reserved area of the disk.

6. The method of claim 1 in which storing the RRO offset values for said plurality of data tracks as RRO data in a reserved area on the magnetic disk comprises writing the RRO data for a plurality of tracks to the reserved area several at a time, rather than writing RRO data for each track individually.

7. The method of claim 1 in which the reserve area has an error checking mechanism to make sure the correct data is written to the disk.

8. The method of claim 7 in which the error checking mechanism comprises error correcting codes (ECC) and/or cyclic redundancy checks (CRC).

9. The method of claim 1 in which the data tracks on the magnetic disk are shingled data tracks.

10. The method of claim 1 in which the reserved area on the magnetic disk is unshingled.

11. The method of claim 1 in which a Look-Up Table (LUT) is used to determine the location of the RRO data for a desired track in the reserved area.

12. A method of correcting repeatable run out (RRO) errors in a rotating data-storage device having a magnetic read/write head and a magnetic disk with a plurality of data tracks, the method comprising:
obtaining a value for a position error signal indicating the relative difference in position between the ideal position of the magnetic read/write head relative to a data track and the actual position of the magnetic head relative to the data track;
calculating an RRO offset value to correct positional error of the magnetic read/write head relative to a plurality of data tracks; and
storing the RRO offset values for said plurality of data tracks as RRO data in a reserved area on the magnetic disk in a consolidated and compressed form, said reserved area being a data storage area on the magnetic disk that is unavailable to software other than host BIOS code;
reading into dynamic random access memory (DRAM) from the reserved area on the magnetic disk compressed RRO data which has been determined based on predictive techniques of what RRO data is needed for upcoming read/write operations;
decompressing the RRO data in the dynamic random access memory (DRAM);
accessing the RRO data from DRAM to correct the magnetic head position relative to the data track; and
performing the predicted read/write operations using the RRO data.

13. The method of claim 12 in which the compressed RRO data comprises compressed RRO data in the time-domain.

14. The method of claim 12 in which the compressed RRO data is decompressed using a hardware decompression engine.

15. The method of claim 12 in which the reserved area comprises a reserved area located at the middle diameter of the disk.

16. The method of claim 12 further comprising storing RRO data in at least one Write Twice Cache region located away from the middle diameter or reserved area of the disk.

17. The method of claim 12 in which storing the RRO offset values for said plurality of data tracks as RRO data in a reserved area on the magnetic disk comprises writing the RRO data for a plurality of tracks to the reserved area several at a time, rather than writing the RRO data for each track individually.

18. The method of claim 12 in which the reserve area has an error checking mechanism to make sure the correct data is written to the disk.

19. The method of claim 18 in which the error checking mechanism comprises error correcting codes (ECC) and/or cyclic redundancy checks (CRC).

20. The method of claim 12 in which the data tracks on the magnetic disk are shingled data tracks.

21. The method of claim 12 in which the reserved area on the magnetic disk is unshingled.

22. The method of claim 12 in which a Look-Up Table (LUT) is used to determine the location of the RRO data for a desired track in the reserved area.

23. The method of claim 12, wherein the predictive techniques comprise rotational positon optimization.

24. The method of claim 12, wherein the predictive techniques comprise scheduling algorithms employing a queue of scheduled read/write operations.

25. The method of claim 24, wherein the queue of read/write operations may be optimized to make disk operation more efficient.

* * * * *